United States Patent [19]

Yoshida et al.

[11] Patent Number: 5,019,295

[45] Date of Patent: May 28, 1991

[54] FOAMABLE SILICONE RUBBER COMPOSITION

[75] Inventors: Takeo Yoshida; Masaharu Takahashi, both of Annaka, Japan

[73] Assignee: Shin-Etsu Chemical Co., Ltd., Tokyo, Japan

[21] Appl. No.: 501,714

[22] Filed: Mar. 30, 1990

[30] Foreign Application Priority Data

Mar. 31, 1989 [JP] Japan .................................. 1-82532

[51] Int. Cl.$^5$ .............................................. H01B 1/06
[52] U.S. Cl. ..................................... 252/518; 252/520; 521/50.5; 521/91; 521/92; 521/122; 521/123; 521/154; 521/79; 264/22
[58] Field of Search ................... 252/518, 520; 521/91, 521/79, 92, 154, 122, 123, 50.5; 264/22

[56] References Cited

U.S. PATENT DOCUMENTS

| | | | |
|---|---|---|---|
| 4,054,540 | 10/1977 | Michalchik | 252/512 |
| 4,120,828 | 10/1978 | Michalchik | 252/512 |
| 4,138,369 | 2/1979 | Arai et al. | 252/520 |
| 4,231,901 | 11/1980 | Berbeco | 521/137 |
| 4,387,115 | 6/1983 | Kitamura et al. | 252/518 |
| 4,391,765 | 7/1983 | Lee et al. | 521/65 |
| 4,460,713 | 7/1984 | Lee et al. | 521/154 |
| 4,555,529 | 11/1985 | Lee et al. | 521/154 |
| 4,559,369 | 12/1985 | Bauman et al. | 521/91 |
| 4,572,917 | 2/1986 | Graiver et al. | 521/154 |
| 4,584,324 | 4/1986 | Bauman et al. | 521/122 |
| 4,818,437 | 4/1989 | Wiley | 523/137 |

*Primary Examiner*—Morton Foelak
*Attorney, Agent, or Firm*—Oblon, Spivak, McClelland, Maier & Neustadt

[57] ABSTRACT

A foamable silicone rubber composition comprising:
(A) a particular diorganopolysiloxane,
(B) a powdery silica filler,
(C) a particular conductive metallic oxide powder,
(D) a foaming agent, and
(E) a vulcanizing agent. This composition can be cured by ultra high frequency vulcanization to produce a cured silicone rubber foam.

10 Claims, No Drawings

FOAMABLE SILICONE RUBBER COMPOSITION

BACKGROUND OF THE INVENTION

1. Field of the Invention

The present invention relates to a foamable silicone rubber composition that can be foamed and cured by ultra high Frequency vulcanization (hereinafter referred to as UHF vulcanization).

2. Description of the Prior Art

Recently, in the field of producing thick-walled or block foams such as foamed building gaskets, foamed insulating materials and foamed rolls, it is strongly required that these foam products are produced economically and stably by continuous extrusion. In the case of ethylene/propylene/diene rubber (EPDM) and chloroprene rubber (CR), for instance, as a production method capable of meeting the above requirement, a method in which a continuously extruded product is subjected to UHF vulcanization, has been put to practical use.

The UHF vulcanization is conducted by exposing a material to be treated to a microwave of $2,450 \pm 50$ MHz or $915 \pm 25$ MHz in a microwave heating oven. The material absorbs the microwave and generates heat, thus being foamed and cured. The value of generated heat (p) (watt/m²) is expressed by the following equation:

$$p = \frac{5}{9} f \cdot E^2 \cdot \epsilon \cdot \tan\delta \times 10^{10}$$

wherein f represents the frequency of a microwave, E represents the high-frequency electric field (V/m), $\epsilon$ represents the relative dielectric constant of the material to be treated, and $\tan\delta$ represents dielectric loss tangent. It has been so far said that the UHF vulcanization is favorably applicable to materials having a dielectric loss index ($\epsilon \cdot \tan E$) of 0.08 or more.

Recently, also in regard to silicones, in order to produce thick-walled or block silicone rubber foams stably and economically by continuous extrusion, conventional production processes are reconsidered so that a new foaming and curing technique may be developed.

Heretofore, as a method of continuous vulcanization, the hot-air vulcanization (HAV) method under normal pressure, the continuous steam vulcanization (CV) method and the liquid curing medium (LCM) method are known. However, these methods have the disadvantages that they are not suited to produce foams of continuous length, and the state of cells in the foams is not good.

It is also said that to apply UHF vulcanization to silicone rubbers, is substantially impossible because the silicone rubbers generally have a loss index of about 0.03 at 3 GHz.

The Japanese Pre-examination Patent Publication (KOKAI) No. 37963/1977 discloses a method in which an organopolysiloxane composition is cured with a microwave. In the organopolysiloxane as the base component of the organopolysiloxane composition used in this method, the allyl group, fluorinated aliphatic hydrocarbon groups, mercapto group-containing hydrocarbon groups, carbinolgroup containing hydrocarbon groups or aliphatic hydrocarbon ether groups account for 5 mol% or more of all the organic groups bonded to silicon atoms. The organopolysiloxane composition has the disadvantage that heat resistance, weather resistance and electric properties are deteriorated in the cured product of the composition, although these properties are inherently possessed by silicone compositions. Therefore, the composition is not suitable in practical use.

SUMMARY OF THE INVENTION

Accordingly, an object of the present invention is to solve the problems described above, and to provide a foamable silicone composition that can produce a foam having good properties inherent in silicone rubbers by UHF vulcanization.

Thus, according to the present invention, there is provided a foamable silicone rubber composition comprising:

(A) a diorganopolysiloxane having the average unit formula:

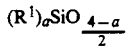

wherein $R^1$ represents a substituted or unsubstituted monovalent hydrocarbon group, $R^1$'s in the molecule may be the same or different, at least 98 mol% of the $R^1$'s are alkyl groups having from 1 to 4 carbon atoms, and a represents a number of from 1.95 to 2.05, and having an average polymerization degree of from 3,000 to 30,000, (B) a powdery silica filler, (C) an electroconductive metallic oxide powder having an average particle diameter of not more than 30 μm and a specific resistance of not more than 500 Ω·cm, (D) a foaming agent, and (E) a vulcanizing agent.

The foamable silicone rubber composition of the present invention can be formed into a foam by UHF vulcanization. The foam has fine and uniform cells therein, and has the properties inherent in silicone rubbers accordingly, the composition of the present invention is useful as a material for producing thick-walled or block silicone rubber foams such as foamed building gaskets, foamed insulating materials and foamed rolls by continuous extrusion.

DETAILED DESCRIPTION OF THE INVENTION

(A) Diorganopolysiloxane

The diorganopolysiloxane of the component (A), a main component of the composition, is represented by the average unit formula:

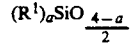

wherein $R^1$ and a are as defined above, and having an average age polymerization degree of from 3,000 to 30,000.

The substituted or unsubstituted monovalent hydrocarbon group represented by $R_1$ includes, for example, alkyl groups having from 1 to 4 carbon atoms such as methyl, ethyl, propyl, and butyl; alkenyl groups such as vinyl and allyl; aryl groups such as phenyl and tolyl; corresponding substituted hydrocarbon groups in which part or all of the hydrogen atoms are substituted with a halogen atom such as the chloromethyl group and the 3,3,3-trifluoropropyl group. Plural $R^1$'s in the diorganopolysiloxane molecule may be the same or different, but 98 mol% or more of the $R^1$'s need to be alkyl groups having 1 to 4 carbon atoms. If the amount of the alkyl group is less than 98 mol%, properties inherent in silicone rubbers such as heat resistance, cold resistance, release properties, etc. of the cured product of the composition become unsatisfactory. Of the alkyl groups having 1 to 4 carbon atoms, the methyl group is preferred. Of the groups other than the alkyl groups, preferred are the vinyl, phenyl and 3,3,3-trifluoropropyl groups.

In said average unit formula, a is a number of from 1.95 to 2.05, preferably from 1.98 to 2.03. The diorganopolysiloxane having a of less than 1.95 has poor flowability, and can mix with the other components uniformly with difficulty. The diorganopolysiloxane having a of more than 2.05 has not a sufficient polymerization degree, and therefore has too low a viscosity, Hence, any diorganopolysiloxane having a which is outside the range of from 1.95 to 2.05, is unsuitable for the present invention.

Further, the diorganopolysiloxane of the component (A) also needs to have an average polymerization degree of from 3,000 to 30,000, preferably from 4,000 to 10,000. The organopolysiloxane having an average polymerization degree of less than 3,000 has too low a viscosity, resulting in a composition having a low plasticity and poor retention of shape. The diorganopolysiloxane having an average polymerization degree of more than 30,000 can be mixed with the other components with difficulty.

(B) Powdery silica

The powdery silica of the component (B) is blended for the purpose of reinforcing, thickening and extending the silicone composition. It includes, for example, fumed silica, precipitated silica, corresponding silicas of which surfaces have been made hydrophobic by treatment, quartz fine powder, and diatomaceous earth.

Normally, the powdery silica filler is used preferably in an amount of from 10 to 300 parts by weight, more preferably from 50 to 200 parts by weight, per 100 parts by weight of the diorganopolysiloxane of the component (A). If the amount of the powdery silica is too small, reinforcement obtained is insufficient, and the composition obtained has poor workability. If the amount of the powdery silica is too large, the composition obtained exhibits extremely poor workability, specifically poor flowability and discharge property at a nozzle when subjected to continuous extrusion.

(C) Electroconductive metallic oxide powder

The electroconductive metallic oxide powder of the component (C) is blended to enhance microwave absorption and heat-generation properties of the composition.

The conductive metallic powder needs to have an average particle diameter of 30 μm or less, preferably from 0.1 to 10 μm, and has a specific resistance of 500 ω·cm or less, preferably 300 ω·cm or less. If the average particle diameter is more than 30 μm, the composition obtained may produce, by vulcanization, a foam having an extremely low strength. If the specific resistance is more than 500 ω·cm, the composition obtained has an insufficient microwave absorption and low heat-generation properties; hence UHF vulcanization can be carried out with difficulty.

The electroconductive metallic oxide powder includes, for example, a powder prepared by sintering an oxide of aluminum, gallium, indium and tin together with zinc oxide, and titanium-tin-antimony oxide powder. More specifically, it includes, for example, electroconductive zinc white of zinc oxide-aluminum oxide system (e g., "Conductive zinc white" supplied by Honjo Chemical Co.) and white electroconductive powder of titanium oxide-tin oxide-antimony oxide system (e.g , W-1 and W-10, tradenames, supplied by Mitsubishi Metal Corp.).

The electroconductive metallic oxide powder stated above is substantially white; hence the composition can be colored in a variety of colors by adding a colorant as desired.

Normally, the electroconductive metallic oxide powder of the component (C) is added to the composition preferably in an amount of from 5 to 200 parts by weight, more preferably from 20 to 100 parts by weight, per 100 parts by weight of the component (A) If the amount of the component (C) is too small, the composition obtained may not be foamed or cured sufficiently if exposed to microwave. On the other hand, if the amount of the component (C) is too large, the foam obtained by vulcanization from the resulting composition may have a low strength.

(D) Foaming agent

The foaming agent of the component (D) is not particularly limited as long as it is stable at room temperature, and generates gas for forming cells on heating. As the cell-forming gas, nitrogen gas is generally used, but carbon acid gas, etc. can be used.

The foaming agent includes, for example, azobisisobutyronitrile, dinitropentamethylenetetramine, benzenesulfohydrazide, N,N'-dinitroso-N,N'-dimethylterephthalamide, azodicarbondiamide and the like.

Normally, the foaming agent of the component (D) is added to the composition preferably in an amount of from 1 to 10 parts by weight, more preferably from 3 to 7 parts by weight, per 100 parts by weight of the component (A). If the amount of the foaming agent is too small, the cell-forming gas is insufficiently generated, so that a good foam may not be obtained. An excess of foaming agent is not only disadvantageous from economical viewpoint, but also may lower workability of the composition obtained.

(E) Vulcanizing agent

The vulcanizing agent of the component (E) is added to the composition to make crosslinking possible in the composition, and includes, for example, an organic peroxide and a platinum family metal catalyst.

The organic peroxide includes, for example, benzoyl peroxide, monochlorobenzoyl peroxide, p-methylbenzoyl peroxide, 2,4-dichlorobenzoyl peroxide, t-butyl perbenzoate, dicumyl peroxide, and 2,5-bis-t-butylperoxy-2,5-dimethylhexane, which may be used singly or in combination of two or more.

The organic peroxide is normally added to the composition in an amount of preferably from 0.5 to 5 parts by weight, more preferably from 0.5 to 3 parts by weight, per 100 parts by weight of the component (A). If the amount of the organic peroxide is too small, the cured product of the resulting composition may have insufficient physical properties, and the foam obtained has poor toughness. On the other hand, if the amount of the component (E) is too large, the foam obtained may become a hard sponge-like product.

The platinum family metal catalyst may be used as the vulcanizing agent in the case where the diorganopolysiloxane of the component (A) has an alkenyl group in its molecule, so that the composition of the present invention is prepared as an addition-vulcanization type silicone composition. In this embodiment, an organohydrogenpolysiloxane having at least two silicon-bonded hydrogen atoms in the molecule is required to be added to the composition, which silicon-bonded hydrogen atoms are to be reacted with said alkenyl group. The organohydrogenpolysiloxane can take any structure of linear, branched or cyclic one, and includes, for example, the compound having the general formula:

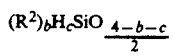

wherein R² represents a C₁-C₈ substituted or unsubstituted monovalent hydrocarbon group, and b and c are each a number of not less than 0, provided b+c ranges from 1.0 to 3.0, and having at least two Si-H bonds in the molecule. R² preferably represents a C₁-C₄ alkyl groups such as methyl, ethyl, propyl and butyl, aryl groups such as phenyl and tolyl, and corresponding substituted groups having at least one substituent such as 3,3,3-trifluoropropyl group, and the compound preferably has a polymerization degree of 300 or less. More specifically, the organohydrogenpolysiloxane includes, for example, the compounds below.

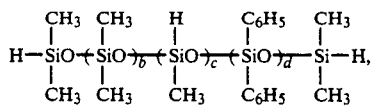

wherein b, c and d each represent an integer of 0 or more, provided b+c+d is 300 or less,

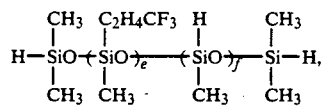

wherein e and f each represent an integer of 0 or more, provided e+f is 300 or less,

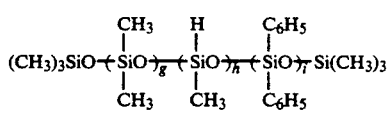

wherein g and i are each an integer of 0 or more, and h represents an integer of 2 or more, provided g+h+i is 300 or less,

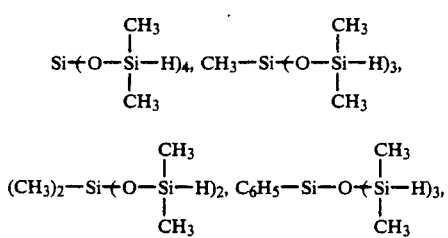

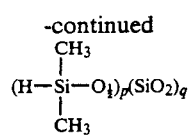

wherein p and q are each more than 0, provided p+q=1, and

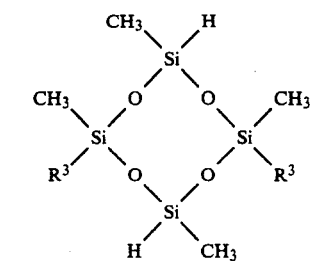

wherein R₃ represents a hydrogen atom, or an C₁-C₈ monovalent hydrocarbon group such as an alkyl group and an aryl group, or a triorganosiloxy group such as the trimethylsiloxy group.

The organohydrogenpolysiloxane is used in an amount such that the ratio of the number of the silicon-bonded hydrogen atoms to that of said alkenyl groups are preferably in the range from 0.5 to 5, and more preferably from 1 to 3.

The platinum family metal catalyst includes, for example, a platinum catalyst, a palladium catalyst, and rhodium catalyst. The platinum catalyst is preferred, including, for example, solid platinum supported on a carrier such as alumina and silica, platinum black, chloroplatinic acid, alcohol-modified chloroplatinic acid, chloroplatinic acid-olefin complexes, and chloroplatinic acid-vinylsiloxane complexes.

The platinum family metal catalyst is used preferably in an amount of from 0.00005 to 0.05 parts by weight, more preferably from 0.0002 to 0.02 parts by weight, in terms of platinum family metal content per 100 parts by weight of the diorganopolysiloxane of the component (A). If the amount of the catalyst is too small, the curing reaction does not proceed sufficiently. Use of an excess of the catalyst only brings about economical disadvantage.

Other components

A variety of additives known per se may be added to the present composition in addition to the components described above so long as UHF vulcanization is not adversely affected. For example, there may be added as required a dispersing agent such as low molecular weight siloxane having a polymerization degree of 100 or less, silanes containing a silanol group, and silanes containing an alkoxyl group, a heat resistance improver such as cerium oxide, a fire retardant such as platinum compounds, and pigments for coloring. Fillers other than powdery silica, such as, for example, calcium silicate, calcium carbonate, glass fiber, etc. may be added.

Preparation of the foamable silicone rubber composition and production of a foam The foamable silicone rubber composition can be readily prepared by kneading given amounts of the components described above uniformly.

This rubber composition has a loss index of 0.2 or more; hence it can be formed by UHF vulcanization into a good foam having excellent properties inherent in silicone rubbers.

The production of a foam can be conducted continuously using a continuous extrusion vulcanization unit provided with a vent extruder, a UHF heating zone, a secondary vulcanization zone and a haul-off.

Specifically, the composition is continuously extruded from the extruder into a form, which is exposed to a microwave of, e.g., 900-5,000 MHz in the UHF heating zone, and the extruded form thereby generates heat, so that, in the case where an organic peroxide is used as the component (E), a foaming agent and the organic peroxide pylolytically decompose to proceed with foaming and vulcanization simultaneously. In the case where a platinum family metal catalyst is used as the component (E), the alkenyl group possessed by the component (A) and the Si—H bond of an organohydrogenpolysiloxane undergo addition reaction to form crosslinking, and simultaneously a foaming agent decomposes; thereby foaming and vulcanization proceed. In order to accelerate the foaming and vulcanization, said UHF heating zone may be provided with a heater that serves to promote increase in temperature.

The foaming and vulcanization is performed almost completely in the UHF vulcanization zone. However, this treatment may be followed by secondary vulcanization, if necessary, in an oven equipped with a conventional heater; thus vulcanization is completely performed, and decomposition products are removed. Thus, a silicone rubber foam with fine cells of uniform shape, having heat resistance, cold resistance, weather resistance and a low permanent compression set is obtained. The secondary vulcanization is normally carried out by heating a matter to be treated at 150 to 250° C.

parts of said organopolysiloxane, 3 parts of diphenylsilanediol and 4 parts of dimethylpolysiloxane terminated with silanol groups with a polymerization degree of 10 were added as a dispersing agent, and 40 parts of Aerosil (tradename of a fumed silica, supplied by Nippon Aerosil KK) was further added. The mixture was kneaded with a two-roll mill, and then heated at 150° C. for 4 hours to prepare a base compound.

In each of Examples and Comparative Examples, to 100 parts of the base compound were added a electroconductive metallic oxide powder as given in Table 1, azobisisobutyronitrile (foaming agent), and 2,4-dichlorobenzoyl peroxide and dicumyl peroxide (vulcanizing agent) were added in respective amounts as given in Table 1. The mixture obtained was kneaded with a two roll mill to prepare a foamable silicone rubber composition.

The foamable silicone rubber composition was then supplied in an extruder having a cylinder bore of 40 mm$\phi$, and a ratio (L/D) of cylinder length (L) to cylinder bore (D) of 12, and equipped with a die of 20 mm$\phi$/10mm$\phi$, and extruded continuously into a tube. The extrudate was passed through two UHF heating zones each 1.5 m long and each radiating a microwave with a frequency of 2450±50 MHz (power output 1.0 kW), at a speed of 2 m/min, while hot air of 130° C. was being circulated continuously in the UHF heating zones. Properties of the foam obtained was measured.

The results are given in Table 1.

In comparative Examples 2 and 3, the composition was subjected to hot-air vulcanization (HAV) at 130° C. under normal pressure in two hot air ovens (each 1.5 m in length) instead of the above stated UHF vulcanization.

TABLE 1

| Silicone composition | Example | | | | | Comparative Example | | |
|---|---|---|---|---|---|---|---|---|
| (parts by weight) | 1 | 2 | 3 | 4 | 5 | 1 | 2 | 3 |
| Base compound | 100 | 100 | 100 | 100 | 100 | 100 | 100 | 100 |
| Electroconductive zinc white *1 | — | — | — | 30 | 60 | — | — | — |
| White electroconductive W-1 *2 | 25 | 50 | 80 | — | — | — | — | 50 |
| Azobisisobutyronitrile | 2.5 | 2.5 | 2.5 | 3.0 | 3.0 | 2.5 | 2.5 | 2.5 |
| 2,4-dichlorobenzoyl peroxide | 0.5 | 0.4 | 0.3 | 0.5 | 0.4 | 0.5 | 0.5 | 0.4 |
| Dicumyl peroxide | 1.5 | 1.5 | 1.5 | 1.5 | 1.5 | 1.5 | 1.5 | 1.5 |
| Loss index *3 | 0.01 | 0.14 | 0.18 | 0.19 | 0.12 | 0.023 | — | 0.14 |
| Vulcanization method | UHF | UHF | UHF | UHF | UHF | UHF | HAV | HAV |
| Properties of foam | | | | | | | | |
| Vulcanized condition | Completely vulcanized | | | | | Insufficient | Unvulcanized | Unvulcanized |
| Expansion ratio | 3.15 | 3.85 | 3.50 | 3.47 | 3.33 | 1.32 | not foamed | not foamed |
| Cell condition | Fine and uniform | | | | | Coarse, partly foamed | Bad | Bad |

Remarks
*1: Zinc oxide-aluminum oxide powder supplied by Honjo Chemical Co.
Average particle diameter: 1.5 μm,
Specific resistance: 80 Ωcm
*2: Titanium oxide-tin oxide-antimony oxide powder supplied by Mitsubishi Metal Corp.
Average particle diameter: 0.2 μm,
Specific resistance: 10 Ωcm
*3: measured by exposing to microwave with a frequency of 1 MHz

EXAMPLES

The present invention will now be described in more detail with reference to working examples and comparative examples. In the description below, part(s) denotes part(s) by weight, unless otherwise noted.

EXAMPLES 1-3, Comparative Examples 1-3

As a component (A), an organopolysiloxane composed of 99.825 mol% of dimethylsiloxane units, 0.15 mol% of methylvinylsiloxane units, and 0.025 mol% of dimethylvinylsiloxy units with an average polymerization degree of 8,000 in a gum-like state was used. To 100

We claim:
1. A process which comprises microwaving a foamable silicone rubber composition consisting essentially of:

(A) a diorganopolysiloxane having the average unit formula:

$$(R^1)_a SiO_{\frac{4-a}{2}}$$

wherein $R^1$ represents a substituted or unsubstituted monovalent hydrocarbon group, $R^1$'s in the molecule may be the same or different, at least 98 mol% of the $R^1$'s are alkyl groups having from 1 to 4 carbon atoms, and a represents a number of from 1.95 to 2.05, and having an average polymerization degree of from 3,000 to 30,000, (B) a powdery silica filler, (C) an electroconductive metallic oxide powder having an average particle diameter of not more than 30 μm and a specific resistance of not more than 500 φ·m, (D) a foaming agent, and (E) a vulcanizing agent.

2. The process of claim 1, wherein said composition contains 10 to 300 parts by weight of the powdery silica filler of the component (B), 5 to 200 parts by weight of the electroconductive metallic oxide powder of the component (C), 1 to 10 parts by weight of the foaming agent of the component (D), and not more than 5 parts by weight of the vulcanizing agent of the component (E), per 100 parts by weight of the diorganopolysiloxane of the component (A).

3. The process of claim 1, wherein in the diorganopolysiloxane of the component (A) the methyl group accounts for not less than 98 mol% of all the organic groups bonded to silicon atoms.

4. The process of claim 1, wherein the electroconductive metallic oxide powder of the component (C) has a specific resistance of not more than 300 φ·cm.

5. The process of claim 1, wherein the vulcanizing agent of the component (E) is an organic peroxide.

6. The process of claim 5, wherein said organic peroxide is contained in an amount of from 0.5 to 5 parts by weight per 100 parts by weight of the diorganopolysiloxane of the component (A).

7. The process of claim 1, wherein the diorganopolysiloxane of the component (A) contains an alkenyl group in the molecule as an $R^1$ bonded to a silicon atom.

8. The process of claim 7, wherein the said composition further comprises an organohydrogenpolysiloxane having at least two silicon-bonded hydrogen atoms and wherein said vulcanizing agent of the component (E) is a platinum family metal catalyst.

9. The process of claim 8, wherein said organohydrogenpolysiloxane is contained such that the ratio of the silicon-bonded hydrogen atoms to the silicon-bonded alkenyl groups possessed by the diorganopolysiloxane of the component (A) is in a range of from 0.5 to 5, and said platinum family catalyst is contained in an amount of from 0.00005 to 0.05 parts by weight in terms of platinum family metal content per 100 parts by weight of the diorganopolysiloxane of the component (A).

10. The process according to claim 1, comprising the steps of continuously extruding the foamable silicone rubber composition and subjecting the extrudate to microwave vulcanization.

* * * * *